Aug. 13, 1968 T. W. LOUKS ET AL 3,396,582
THERMOMETER ASSEMBLY
Filed July 25, 1966 3 Sheets-Sheet 1

INVENTORS
Theodric W. Louks
Ronald E. McLin
BY
Strauch, Nolan, Neale, Nies & Bromaugh
ATTORNEYS

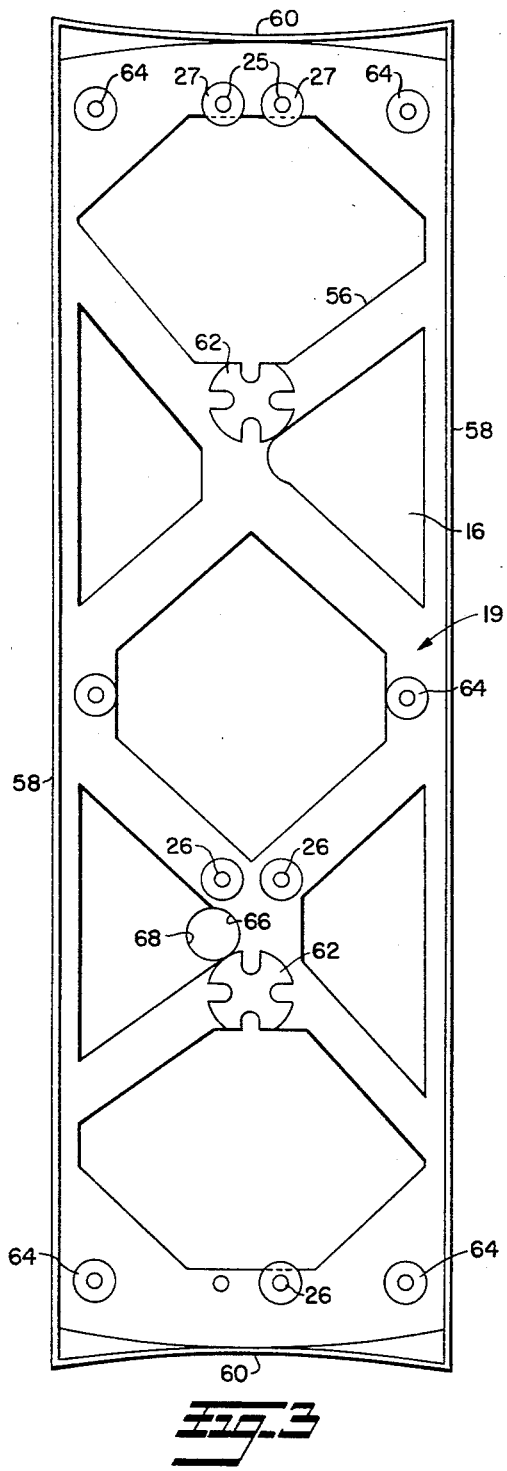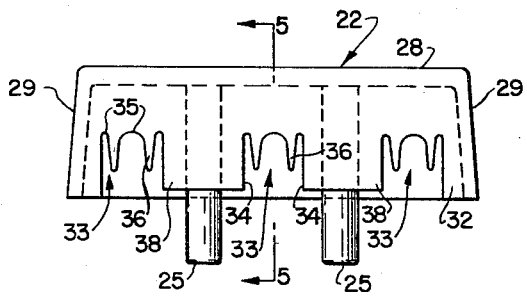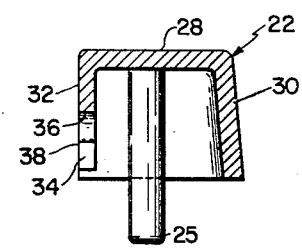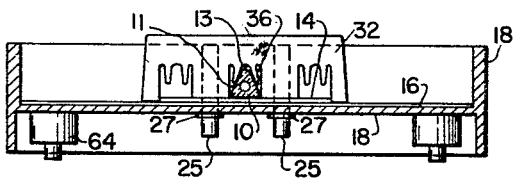

Aug. 13, 1968  T. W. LOUKS ET AL  3,396,582
THERMOMETER ASSEMBLY
Filed July 25, 1966  3 Sheets-Sheet 3
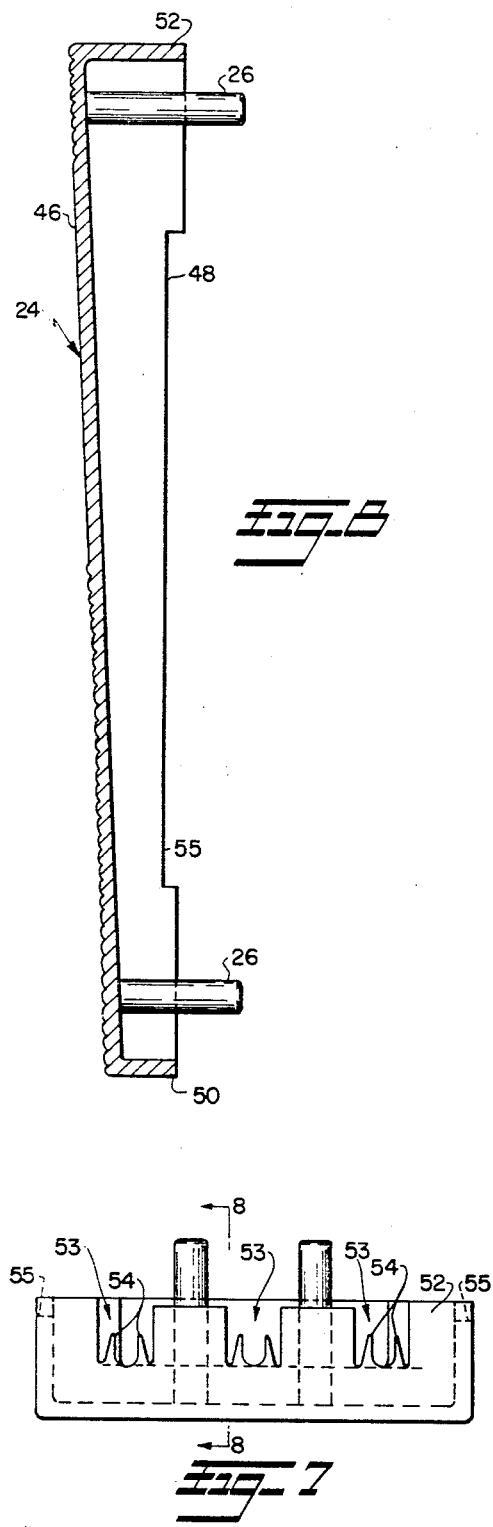
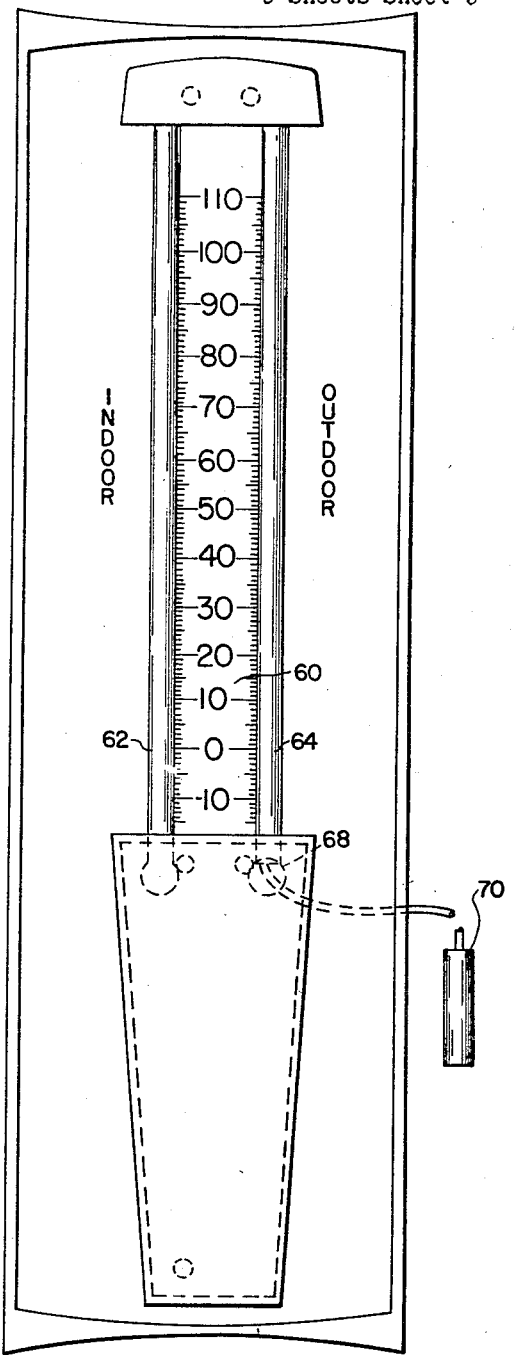
INVENTORS
Theodric W. Louks
Ronald E. Mc Lin
BY
Strauch, Nolan, Neale, Nies & Bronaugh
ATTORNEYS great# United States Patent Office 3,396,582
Patented Aug. 13, 1968

3,396,582
THERMOMETER ASSEMBLY
Theodric W. Louks, Medway, and Ronald E. McLin, Springfield, Ohio, assignors to Mid-Continent Manufacturing Co., a corporation of Ohio
Filed July 25, 1966, Ser. No. 567,460
10 Claims. (Cl. 73—376)

ABSTRACT OF THE DISCLOSURE

A thermometer assembly including a glass thermometer tube and a backing member having calibration markings, and a clamp for holding the tube in axially fixed position on the backing comprising a body of comparatively rigid material bridging across the thermometer tube and fixed relative to the backing member with a notch shaped to receive said thermometer tube which is of a width greater than the width of the thermometer tube and which has yieldable means located in it and normally spaced apart less than the width of the tube for frictionally engaging and being displaced by the tube as the clamp body is secured to the backing member so as to anchor the tube relative to the calibration markings on the backing.

---

Normally glass thermometer tubes of the conventional stem and bulb type are mounted on backing members or scale plates by wire staples, wire stitches, riveted straps, and other such means. A common problem with these mounting means is that positive frictional engagement of the tube to prevent relative lengthwise or axial movement is difficult to achieve when considering that thermometer tube blanks have a variation in outer dimensions which results in oversized tubes being broken and undersized tubes inadequately secured to the scale plate. Further, both the upper end of the thermometer tube and the lower bulb are sometimes exposed and free to be bumped during handling or shipping of the thermometer thereby making possible disturbance of the thermometer alignment relative to the scale calibrations on the backing plate.

A well-known prior art device for protecting thermometer bulbs against damage and movement by bumping is a perforated protective metal cover mounted over and out of contact with the bulb. Even with this type of protective device, however, the upper end of the thermometer tube is usually not protected and, further, such cover provides no positive anchorage of the thermometer tube to the scale plate.

Further, many of the thermometer tubes produced for household use are of triangular configuration to provide magnification of the liquid level when viewed through the magnification lens. A suitable mounting must also be capable of properly aligning the thermometer tube on a graduated scale so that the apex angle faces away from the scale toward the viewer.

Accordingly, a principal object of this invention is to provide novel clamp means for positively, frictionally engaging the thermometer stem adjacent its opposite ends while it is mounted in calibrated relation with a graduated scale plate to prevent relative axial movement between thermometer and the scale plate.

Another object of this invention is to provide a novel thermometer assembly having upper and lower end caps mounted over the respective ends of the thermometer tube including displaceable flap means in a notch for frictionally engaging the tube stem near its respective ends to prevent sliding or rotational movement, for indexing the tube rotationally for optimum magnification and for accommodating variations in tube shape and size.

Still another object of this invention is to provide a novel thermometer-mounting frame of symmetrical configuration for obviating possible misorientation between the thermometer tubes and the frame during assembly and which is provided with means for hanging on a wall mount and for spacing from a vertical wall when so mounted thereon to enable circulation of room temperature air behind the frame and about the thermometer bulb so that the overall room temperature is indicated by the thermometer reading.

Yet another object of this invention is to provide a novel method for mounting thermometer tubes to a scale plate comprising the steps of initially locating the thermometer tube on a graduated scale plate in proper calibrated alignment therewith; positioning the scale plate on a backing member; placing upper and lower end cap members over the respective ends of the thermometer tube; and drawing the backing member tightly against the upper and lower end caps, the end caps having means for properly aligning the scale plate with respect to the backing member and engaging the thermometer tube adjacent its respective ends to prevent movement thereof with respect to the scale plate or the backing member.

These and other objects, features and advantages of the invention will become more fully apparent by reference to the appended claims and the following detailed description when read in conjunction with the accompanying drawings, wherein:

FIGURE 3 is a rear elevation of the thermometer assembly of FIGURE 1 showing the thermometer support frame;

FIGURE 4 is an enlarged view in elevation of the upper end cap of FIGURE 1 showing three notches each with displaceable flap means used to anchor the thermometer tube to the scale plate;

FIGURE 5 is a sectional view taken substantially along line 5—5 of FIGURE 4;

FIGURE 6 is a transverse sectional view taken substantially along line 6—6 of FIGURE 1;

FIGURE 7 is a view similar to FIGURE 4 but of the lower end cap of FIGURE 1;

FIGURE 8 is a longitudinal sectional view taken substantially along line 8—8 of the lower end cap shown in FIGURE 7; and FIGURE 9 is a front view of another embodiment of the thermometer assembly of this invention showing an indoor-outdoor thermometer.

Figure 1:
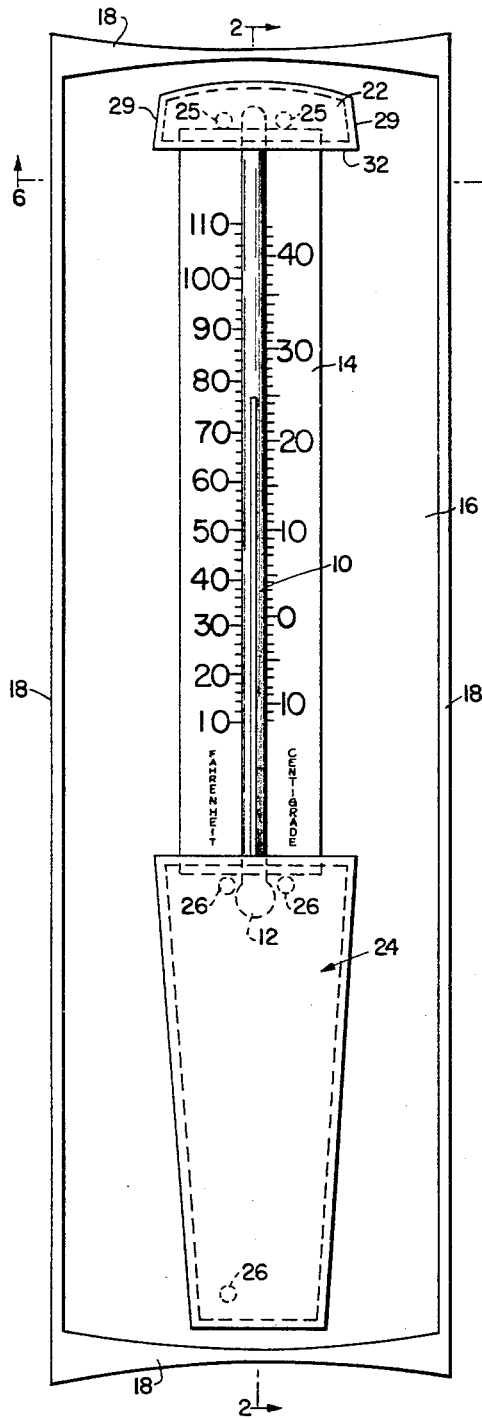
FIGURE 1 is a front view of a thermometer assembly embodying one form of the invention.
Figure 2:
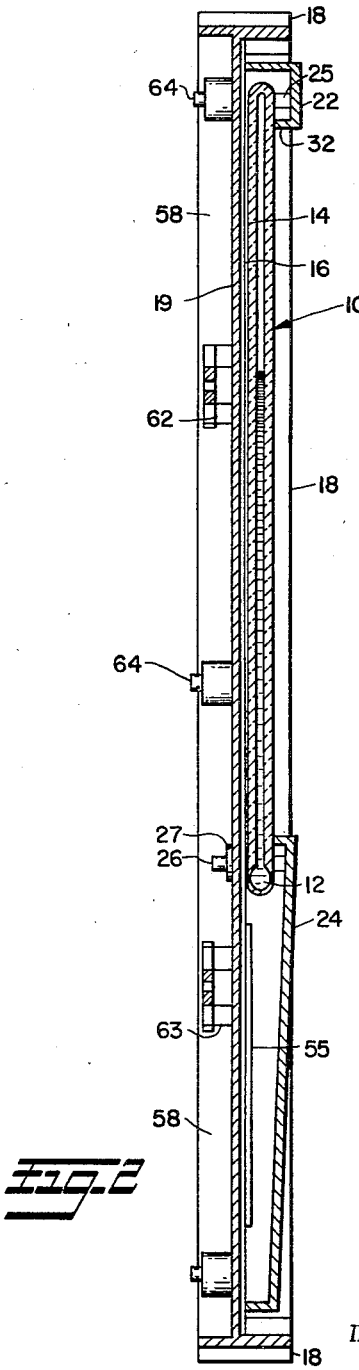
FIGURE 2 is a sectional view taken substantially along line 2—2 of FIGURE 1.

With continued reference to the drawings wherein like reference numerals have been used throughout to identify like elements, FIGURES 1, 2 and 6 show a thermometer assembly which includes a glass thermometer tube 10 having a triangular cross-section stem portion 11 connected to a bulb 12. Tube 10 may be centrally mounted on a graduated scale plate 14 in calibrated relation with both a Fahrenheit and centrigrade scale with its apex 13 facing outwardly. Plate 14 is mounted on a decorative backing member 16 which fills the entire area within the marginal edges 18 of support frame 19 as shown in FIGURE 1.

FIGURE 3 shows from the rear side the support frame 19 used with the thermometer assembly of this invention. Frame 19 may be made of a suitable plastic material such as polystyrene and be provided with a grid work of support members 56 which separate side walls 58 and arcuate end walls 60. A pair of disc-like wall fasteners 62 are supported by integral projections 63 (see FIGURE 2) which extend rearwardly from the plane of support members 56. Fasteners 62 are provided with slots for mounting the thermometer assembly on a hook or other like projection from the vertical side wall of a room. Stepped studs 64 may be provided at the four corners of the frame and extend beyond fasteners 62 to maintain the thermometer in spaced relation from the surface upon which it is mounted to facilitate air circulation.

Frame 19 is further provided with an arcuate cut-out portion 66 near the lower wall fastener 62 which is aligned with a circular hole 68 in backing member 16 which may be used for passing a remote temperature sensing device outside the frame in the indoor-outdoor embodiment of this invention as shown in FIGURE 9.

Frame 19 is provided near its upper end with two apertures through which pins or studs 25 extend as shown in FIGURE 3. At the lower end, a further aperture is provided through which pin 26 extends; and just above wall fastener 62, two additional apertures are provided through which two pins 26 extend.

Scale plate 14 (see FIGURES 1, 2 and 6) contains the calibration markings and is preferably a flat metal sheet having a length slightly shorter than thermometer tube 10. Scale plate 14 may be placed directly on frame 19; however in the illustrated embodiment the thermometer is a highly decorative instrument and frame 19 encompasses an area much larger than is necessary merely for a thermometer. Thus in the embodiment here illustrated, a flat backing member 16 is provided which fits inside the peripheral marginal edges 18 of frame 19. The outer surface may be covered with a decorative coating or sheet with a pressure sensitive adhesive on the rear surface. Scale plate 14 is placed on top of backing member 16.

Scale plate 14, thermometer tube 10 and backing member 16 are all secured to support frame 19 by means of upper and lower clamp members 22 and 24 respectively which are formed in a manner to be described below to engage without breaking the thermometer tube 10. Clamp members 22 and 24 may be formed of a suitable plastic such as polystyrene, and in the illustrated embodiment also serve as protective covers or end caps fitting over the ends of the thermometer tube. Upper clamp member 22 is formed with two pins or studs 25 on opposite sides of thermometer tube 10 which pass through aligned apertures in backing member 16 and support frame 19 and receive sheet metal locking fasteners 27 (see FIGURES 3 and 6) for drawing clamp member 22 tightly into engagement toward the front side of the frame. Any similar fasteners such as lock nuts or the like may be used. Lower clamp member 24 having three pins or studs 26 may be drawn toward the front of the frame by use of similar fasteners 27.

Referring now to FIGURE 4, upper clamp member or end cap 22 is a recessed cover member having an upper substantially planar outer wall 28 carrying dependent side walls 29, rear wall 30 and front wall 32. Front wall 32 may be provided with three identical notched portions 33 having side edges 34 and an upper edge 35 which is formed to have a pair of identical, spaced, cantilever-mounted downwardly tapered flaps 36. Each flap is spaced from its adjacent notch side edge 34 and has sufficient resilience or flexibility to allow outward flexing thereof into contact with side edge 34 without total fracture, though such displacement may exceed the elastic limit of the flaps. Sections 38 of front wall 32 separate notch portions 33 from each other and are slightly shorter than the remainder of front wall 32 to allow scale plate 14 to fit thereunder as shown in FIGURE 6.

With reference to FIGURES 4 and 5, it will be seen that studs or pins 25 are carried by upper wall 28 and extend downwardly a distance greater than the side and end walls to thus pass through aligned apertures in frame 19.

As shown in FIGURES 7 and 8, the construction of lower end cap 24 is similar to that of upper end cap 22 in that lower end cap 24 is provided with a substantially planar outer wall 46, depending side walls 48, a rear wall 50, a notch containing front wall 52 and depending studs or pins 26 which extend away from wall 46 by a greater distance than the side and end walls. Due to the length of end cap 24 a third stud or pin 26 may be provided near its lower end.

Front wall 52 of lower end cap 24 may be similarly provided with three notch portions 53 each containing a pair of resilient depending flaps 54 spaced from each other and from the side edges of the notch. Additionally, side walls 48 are provided with cut-out portions 55 for allowing circulation of room temperature air over the top of bulb 12.

Referring now to FIGURES 2 and 6, the manner in which end caps 22 and 24 frictionally engage thermometer tube 10 can be best seen. The thermometer is positioned so that apex 13 fits between flaps 36 and 54 of the upper and lower end caps. When studs 25 and 26 are drawn down tightly by fasteners 27 through backing member 16 and support frame 19, depending flaps 36 and 54 on the end caps are drawn tightly against thermometer stem portion 11 near its opposite ends. As shown in FIGURE 6 for upper end cap 22, apex 13 spreads resilient flaps 36 causing the adjacent sides of thermometer tube 10 to contact the inner edges of flaps 36 over a large surface area. Due to the relative size of thermometer tube 10 the spacing between flaps 36, and the spacing between each flap 36 and the adjacent side edge 34 of notch portion 33, flaps 36 spread outwardly into contact with side edges 34 before apex 13 would contact upper edge 35 of cut-out portion 33. Positive frictional engagement is thus provided over the relatively large area of surface contact between the inner edges of flaps 36 and the adjacent sides of thermometer stem 11. The resilience of flaps 36 maintains a positive force on stem 11 at all times due to their inward bias.

If the thermometer stem is of larger than normal cross-section, flaps 36 can spread outwardly beyond their elastic limit and cause some plastic flow to occur, but by proper dimensioning breakage of the tube can be avoided. For undersized thermometer tubes, the resilience of flaps 36 bearing against the adjacent sides of thermometer tube 10 provides sufficient force for positive frictional locking engagement of tube 10 within the asembly. Upper end cap 22 further protects and makes inaccessible the upper end of thermometer tube 10 while lower end cap 24 provides similar locking protection and inaccessibility for bulb 12.

The longitudinal spacing in the assembly between studs 25 on upper end cap 22 and upper studs 26 on lower end cap 24 may be made the same as the length of scale plate 14 such that scale plate 14 is prevented from longitudinal movement along backing member 16 by abutment of its upper and lower end edges with the studs 25 and 26 respectively. Lateral movement of scale plate 14 is also prevented, as shown in FIGURE 6, by engagement of the outer portions of end cap front walls 32 and 52 with the side edges of the scale plate near its upper and lower ends. In this manner, the scale plate is also positioned with respect to backing member 16 such that neither longitudinal nor lateral sliding can occur. The positions of both thermometer 10 and scale plate 14 are, thus, fixed in the assembly and the ends of both are protected and generally inaccessible.

The unique structures of the thermometer assembly components of this invention enable rapid and easy assembly thereof. In assembly of the thermometer, tube 10 is first fixed in calibrated relationship with the graduations on scale plate 14. Normally, the thermometer tubes are marked at liquid levels for one or two convenient temperatures, the thermometer tube matched to and aligned with the proper graduations on the scale plate. If desired, the thermometer may then be tacked to the scale plate with a small amount of adhesive. When tube 10 is placed in position, bulb 12 will extend beyond the lower edge of scale plate 14 and the upper end of tube 10 will extend above the upper edge of scale plate 14 as shown in FIGURE 1.

Backing member 16 is next placed within support frame 19 and scale plate 14 is positioned so that its upper edge abuts the backing member apertures which will receive studs 25 of upper cap 22. When in such alignment, the lower edge of scale plate 14 should be substantially tangent to the apertures in backing member 16 which will receive upper studs 26 of lower cap 24 as shown in FIGURE 1. Either of end caps 22 and 24 is now inserted in place with its studs passing through the respective apertures in both backing member 16 and frame 18 as shown in FIGURES 2 and 3. The studs and caps are then drawn tightly down by means of fasteners 27 so that depending flaps 36 and 54 positively frictionally engage the side edges of thermometer tube 10 and spread outwardly toward the sides of notched portion 33 and 53. When both caps 22 and 24 are securely drawn down by fasteners 27, both scale plate 14 and thermometer tube 10 are frictionally positioned and protected against either longitudinal or lateral movement in the thermometer assembly. While flaps 36 are shown as cantilevers, it is evident that other configurations that are displaceable may be used.

As shown in FIGURE 9, end caps 22 and 24 which carry three notched portions on their front walls are adaptable for use in an indoor-outdoor thermometer assembly. This is accomplished merely by using a different scale plate 60 and two thermometer tubes which fit in the outer two notched portions 33 and 53 of end caps 22 and 24, respectively. The outdoor temperature sensing element 70 is connected by a capillary tube extending through hole 68 in backing member 16 (see also FIGURE 3).

For aesthetic purposes, backing member 16 may be coated with any selected decorative coating material. The backing member itself may be a thin sheet of a metal or plastic. Support frame 19 and end caps 22 and 24 are preferably made from a substantially rigid, high impact polystyrene or other suitable plastic material which has sufficient resilience in small cross-section to provide the necessary deflection to flaps 36 and 54.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A thermometer assembly including a glass thermometer tube and a backing member having calibration markings, and a clamp comprising a body of comparatively rigid material bridging across the thermometer tube and fixed relative to the backing member, said clamp body having a notch shaped to receive said thermometer tube and having a width greater than the width of the thermometer tube and yieldable means located in said notch and normally spaced apart less than the width of said thermometer tube for frictionally engaging and being displaced by the glass thermometer tube as said body is secured to the backing member for anchoring the thermometer tube relative to the calibration markings.

2. The thermometer assembly as defined in claim 1 wherein said yieldable tube engaging means comprise a pair of cantilever mounted flaps formed integrally as part of said notch and separated sufficiently to receive the thermometer tube and be displaced toward opposite outer walls of said notch.

3. The thermometer assembly as defined in claim 2 wherein the thermometer tube has a triangular cross-section, the thickness of the flaps tapers with the inside facing surfaces of said flaps being formed before assembly to be substantially parallel, and upon assembly to substantially follow the contour of opposite side walls of the thermometer tube.

4. The thermometer assembly as defined in claim 1 wherein the clamp body has a pair of studs on opposite sides of the thermometer tube and extending through said backing member, and means engaging said studs on the rear side of said thermometer for drawing said flaps tightly against said thermometer tube.

5. The thermometer assembly defined in claim 1 wherein said clamp body comprises an end cap having upper walls and depending end walls, one of said end walls having said notch carrying a pair of depending resilient flaps therein, said flaps being spaced from each other and from side edges of said notch and being adapted to flex outwardly and receive said thermometer tube therebetween.

6. The thermometer assembly defined in claim 5 wherein the spacing between said flaps and the side edges of said notch and the dimensions of said thermometer tube are such that the outward deflection of said flaps is limited by contact with said notch side edges before said tube comes into contact with the upper edge of said notch.

7. The thermometer assembly defined in claim 1 wherein said calibration markings are on a separate scale plate and said thermometer tube and scale plate are mounted to said backing member; and said clamp body includes means engaging an end and side edges of said scale plate to prevent lateral and longitudinal displacement thereof.

8. The thermometer assembly as defined in claim 1 wherein the thermometer tube is secured to the backing member by a pair of said clamp bodies located at end covering opposite ends of said thermometer tube, said bodies having upper walls that are generally parallel to said backing member and depending walls for supporting the upper wall at a position spaced from the backing member by a pair of said clamp bodies located at end walls.

9. The thermometer assembly as defined in claim 8 comprising a frame having a peripheral up-standing marginal edge, said backing member being mounted to said frame and located by said marginal edge, and each of said pair of clamp bodies having pins extending through said backing member and secured to the rear side of said frame by frictional fasteners.

10. The thermometer assembly as defined in claim 8 comprising a frame having a peripheral up-standing marginal edge, a decorative backing plate covering said frame and located by said marginal edge, a calibrated scale plate overlying part of said decorative backing plate, each of said pair of clamp bodies having pins extending through said backing plate and secured to the rear side of said frame by frictional fasteners, said pins being located at opposite ends of said scale plate to position the scale plate on the backing plate and said bodies clamping both the thermometer tube and scale plate in fixed location relative to the frame.

References Cited

UNITED STATES PATENTS 1,551,609  9/1925  Norwood _____ 73—376
2,570,879  10/1951  Steel _____ 73—376

S. CLEMENT SWISHER, *Acting Primary Examiner.*

WILLIAM HENRY II, *Assistant Examiner.*

UNITED STATES PATENT OFFICE
CERTIFICATE OF CORRECTION

Patent No. 3,396,582                           August 13, 1968

Theodric W. Louks et al.

It is certified that error appears in the above identified patent and that said Letters Patent are hereby corrected as shown below:

Column 6, line 38, "end" should read -- and --; lines 43 and 44, "by a pair of said clamp bodies located at and walls" should read -- , said notch being located in one of said end walls --.

Signed and sealed this 30th day of December 1969.

(SEAL)
Attest:

Edward M. Fletcher, Jr.
Attesting Officer

WILLIAM E. SCHUYLER, JR.
Commissioner of Patents